United States Patent
Kodavalla

(10) Patent No.: US 9,007,394 B2
(45) Date of Patent: Apr. 14, 2015

(54) METHOD AND SYSTEM FOR DYNAMIC BRIGHTNESS CORRECTION IN DIGITAL IMAGES

(71) Applicant: Vijay Kumar Kodavalla, Bangalore (IN)

(72) Inventor: Vijay Kumar Kodavalla, Bangalore (IN)

(73) Assignee: WIPRO Limited, Bangalore (IN)

( * ) Notice: Subject to any disclaimer, the term of this patent is extended or adjusted under 35 U.S.C. 154(b) by 216 days.

(21) Appl. No.: 13/768,009

(22) Filed: Feb. 15, 2013

(65) Prior Publication Data

US 2014/0176596 A1 Jun. 26, 2014

(30) Foreign Application Priority Data

Dec. 21, 2012 (IN) .......................... 5349/CHE/2012

(51) Int. Cl.
*G09G 5/02* (2006.01)
*G06T 11/00* (2006.01)

(52) U.S. Cl.
CPC .................................... *G06T 11/001* (2013.01)

(58) Field of Classification Search
CPC .................................................. G06T 11/001
See application file for complete search history.

(56) References Cited

U.S. PATENT DOCUMENTS

| | | | |
|---|---|---|---|
| 3,742,125 A | 6/1973 | Siegel | |
| 3,893,165 A | 7/1975 | Sunstein | |
| 5,172,224 A | 12/1992 | Collette et al. | |
| 6,163,346 A | 12/2000 | Tsyrganovich | |
| 6,181,828 B1 | 1/2001 | Hogan | |
| 6,690,828 B2 | 2/2004 | Meyers | |
| 7,038,735 B2 | 5/2006 | Coleman et al. | |
| 7,110,046 B2 | 9/2006 | Lin et al. | |
| 7,352,410 B2 | 4/2008 | Chou | |

(Continued)

FOREIGN PATENT DOCUMENTS

EP 0512370 B1 10/1996

OTHER PUBLICATIONS

Lee et al., "Color compensation of histogram equalized images," Proceedings of the SPIE 7241, Color Imaging XIV: Displaying, Processing, Hardcopy, and Applications, 724111 (Jan. 19, 2009).

(Continued)

*Primary Examiner* — Mark Zimmerman
*Assistant Examiner* — Vu Nguyen
(74) *Attorney, Agent, or Firm* — Finnegan, Henderson, Farabow, Garrett & Dunner, LLP

(57) ABSTRACT

This disclosure generally relates to digital image and video signal processing, and more particularly to methods and systems for dynamic brightness correction. In one embodiment, an electronic circuit configured to perform an image correction method is disclosed, the method comprising: obtaining a pixel value of a color space component from an image; determining whether to perform mid-tone correction for the pixel value of the color space component; calculating, via the electronic circuit, a corrected pixel value based on the determination of whether to perform the mid-tone correction for the pixel value of the color space component; and outputting the corrected pixel value. The color space component may be one of: an Intensity component from a Hue-Saturation-Intensity color space; a Value component from a Hue-Saturation-Value color space; a Lightness component from a Hue-Saturation-Lightness color space; and a Brightness component from a Hue-Saturation-Brightness color space.

18 Claims, 8 Drawing Sheets
(1 of 8 Drawing Sheet(s) Filed in Color)

(56) References Cited

U.S. PATENT DOCUMENTS

| | | |
|---|---|---|
| 7,471,823 B2 | 12/2008 | Ubillos et al. |
| 7,630,017 B2 | 12/2009 | Yasuba et al. |
| 7,684,639 B2 | 3/2010 | Zhao et al. |
| 8,131,110 B2 | 3/2012 | Lukac |
| 8,179,478 B2 | 5/2012 | Peng et al. |
| 2010/0060670 A1 | 3/2010 | Kuo |

OTHER PUBLICATIONS

Cromartie et al., "*Edge-affected context for adaptive contrast enhancement*," Proceedings of the 12th International Conference on Information Processing in Medical Imaging, Springer-Verlag, pp. 474-485 (1991).

METHOD AND SYSTEM FOR DYNAMIC BRIGHTNESS CORRECTION IN DIGITAL IMAGES

PRIORITY CLAIM

This disclosure claims priority under 35 U.S.C. §119 to: India Application No. 5349/CHE/2012, filed Dec. 21, 2012, and entitled "METHOD AND SYSTEM FOR DYNAMIC BRIGHTNESS CORRECTION IN DIGITAL IMAGES." The aforementioned application is incorporated herein by reference in its entirety.

FIELD OF THE INVENTION

This disclosure generally relates to digital image and video signal processing, and more particularly to methods and systems for dynamic brightness correction.

BACKGROUND OF THE INVENTION

Electronic devices widely use displays as output devices to present information in visual form. Examples of such electronic devices include televisions or computers. Typically, a video signal is either received by an electronic device or is generated within the device. In either case, an image is then displayed on the display. A number of displays are available, including Liquid Crystal Displays (LCDs), digital projectors, and the like.

Image quality often suffers due to various factors, including the limitations of high-resolution capture devices, transmission losses, and encoding/decoding losses. Thus, image enhancement techniques may be used to improve the quality of displayed visual images. One such image enhancement technique is brightness correction, which is applied statically after the user sets a gain level. However, as display dimensions and resolutions increase, static brightness correction is no longer adequate, because brightness can vary within a frame and among frames in video. Such variation stems from a number of factors, including limitations of high-resolution capture devices, transmission losses, encoding/decoding losses, and the like.

Recently, dynamic brightness correction has been introduced without noticeable success. Such solutions have been limited to dynamic brightness correction on the luminance component alone, which can lead to visible undesired effects, including faded colors and blurred edges. Problems seem to appear whenever dynamic brightness correction is applied to the luminance component of an image that has an object with mid-tone pixels on white background.

SUMMARY

In one embodiment, an electronic circuit configured to perform an image correction method is disclosed, the method comprising: obtaining a pixel value of a color space component from an image; determining whether to perform mid-tone correction for the pixel value of the color space component; calculating, via the electronic circuit, a corrected pixel value based on the determination of whether to perform the mid-tone correction for the pixel value of the color space component; and outputting the corrected pixel value. The color space component may be one of: an Intensity component from a Hue-Saturation-Intensity color space; a Value component from a Hue-Saturation-Value color space; a Lightness component from a Hue-Saturation-Lightness color space; and a Brightness component from a Hue-Saturation-Brightness color space.

It is to be understood that both the foregoing general description and the following detailed description are exemplary and explanatory only and are not restrictive of the invention, as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this disclosure, illustrate exemplary embodiments of the invention and, together with the description, serve to explain the principles of the invention.

DETAILED DESCRIPTION

Exemplary embodiments of the invention are described with reference to the accompanying drawings. Wherever possible, the same reference numbers are used throughout the drawings to refer to the same or like parts. While exemplary embodiments and features of the invention are described herein, modifications, adaptations, and other implementations are possible without departing from the spirit and scope of the invention. Accordingly, the following detailed description does not limit the invention. Instead, the proper scope of the invention is defined by the appended claims.

Systems and methods for dynamic image enhancement are disclosed. In an exemplary embodiment, the system may receive an image pixel (e.g., from an image or a video frame) and analyze the pixel to estimate one or more parameters. Thereafter, the system may perform pixel corrections based on that analysis.

In an exemplary embodiment, the system may be implemented as an electronic circuit configured to perform image correction. For example, the system may be implemented as an integrated circuit (IC), or using a general-purpose hardware processor that is programmed as a specific machine using image correction instructions stored in a memory device. In some exemplary embodiments, the system may be implemented as a system on a chip (SoC). In other exemplary embodiments, the image correction method 200 (discussed in detail, infra) may be implemented by a system comprising various software modules for implementing the steps of the method 200. In some embodiments, such systems may be included or embedded into display systems such as computer monitors, laptop/tablet/smartphone screens, television displays, home theater systems, cinematic projection systems, wearable displays (e.g., Google® Project Glass), or the like.

In another embodiment, the system may be implemented using an image editing software application, where a user interface may be presented to the user for enabling the user to apply corrections to the image. The user interface may include intuitive controls for performing one or more of the intensity/mid-tone correction and the saturation correction and also for selecting a region of the image where correction is to be performed.

Figure 1:
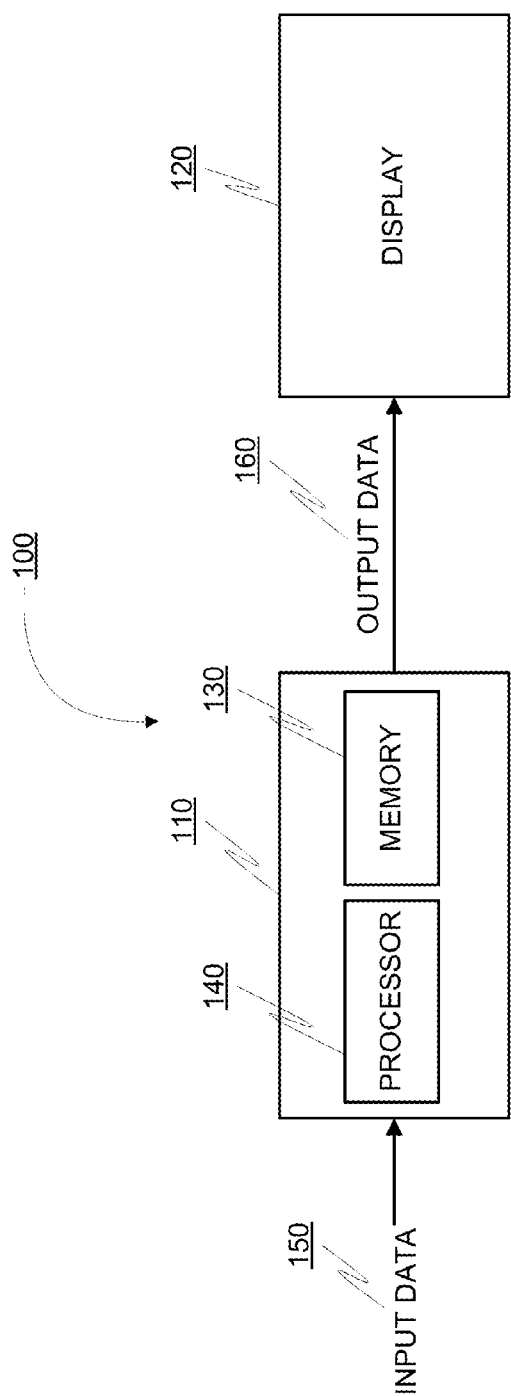
FIG. 1 illustrates an exemplary display system according to an exemplary embodiment of the disclosure.

FIG. 1 illustrates an exemplary display system 100 according to an exemplary embodiment. The display system 100 may include an image processing system 110 and a display 120. The image processing system 110 may further include a memory 130 and a processor 140. Memory 130 may serve as the work memory of the processor 140, and it may store instructions for processing data from an image, such as, for example, a video frame. The processor 140 may sequentially receive input data 150 including the image data; execute the instructions stored in the memory 130; and apply the results of that operation to the input data 150; and provide output data 160. The memory 130 may be a non-transitory computer readable medium, in the form of, for example, Random Access Memory (RAM) or other suitable memory structures known in the art. Output data 160 may include an image for display on display 120.

Figure 2:
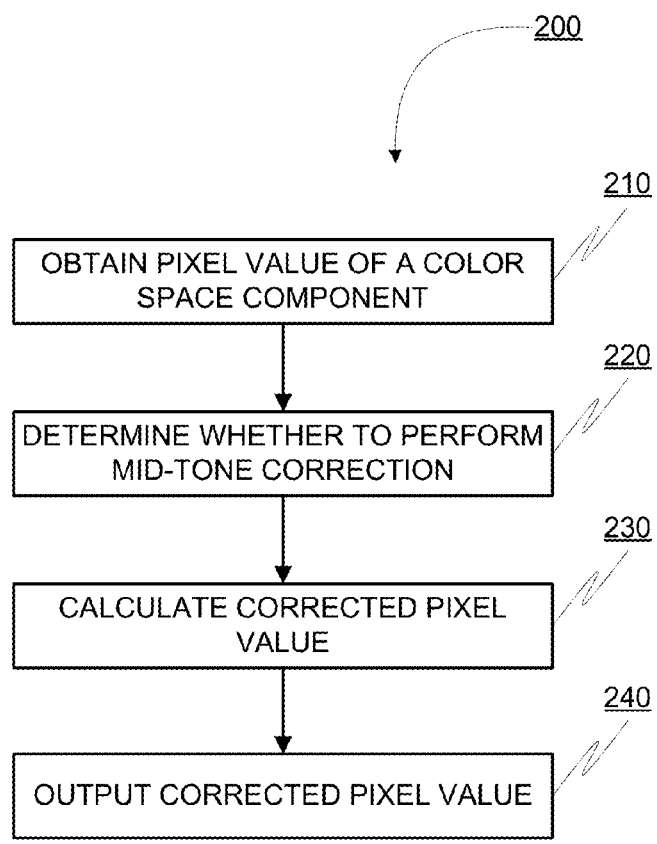
FIG. 2 is a flow diagram illustrating an exemplary image correction method according to an exemplary embodiment of the disclosure.

FIG. 2 is a flow diagram illustrating an exemplary image correction method 200. A pixel value of a color space component from an image may be obtained at step 210. For example, the pixel value may be a value of a brightness component ($I_{IN}$) of a color space, such as: an Intensity component from a Hue-Saturation-Intensity (HSI) color space; a Value component from a Hue-Saturation-Value (HSV) color space; a Lightness component from a Hue-Saturation-Lightness (HSL) color space; or a Brightness component from a Hue-Saturation-Brightness (HSB) color space. As another example, the pixel value may be a value of a saturation component ($S_{IN}$) of a color space, such as a Saturation component from as the above-mentioned color spaces. In some embodiments, this pixel value may correspond to any other display element, e.g., a voxel (Volumetric Pixel or Volumetric Picture Element). The pixel values may be obtained from an image-capturing device, an image-processing device, an intermediate network server, a storage device (e.g., a Hard Drive (HD), a buffer/cache memory, a Solid-State Drive (SSD), etc) or any other appropriate device known to those of ordinary skill in the art.

In an exemplary embodiment, the color space component ($I_{IN}$) may be an intensity component from a Hue-Saturation-Intensity (HSI) color space; a value component from a Hue-Saturation-Value (HSV) color space; a lightness component from a Hue-Saturation-Lightness (HSL) color space; or a brightness component from a Hue-Saturation-Brightness (HSB) color space. It is contemplated that the intensity correction and/or mid-tone gain correction may be performed in any color space in which a component like HSL Luminance, HSB Brightness, HSI Intensity or HSV Value can be separated. Similarly, it is contemplated that saturation correction may be performed in any color space in which a component like Saturation in the HSL/HSB/HSI/HSV color spaces can be separated. It will be recognized by those of ordinary skill in the art that intensity correction may be practiced in conjunction with any color space by converting to-and-from a color space including a component, such as HSL lightness, HSB brightness, HSI intensity, or HSV value, that can be separated. Similarly, it is contemplated that saturation correction may be practiced in conjunction with any color space by converting to-and-from a color space including a component like Saturation in the HSL/HSB/HSI/HSV color spaces, that can be separated. For example, the initial color space may be RGB, YUV, YCbCr, or the like, and a conversion may be first performed to-and-from YUV/RGB to a HSI "working" color space, and intensity and/or saturation correction may be performed in the working color space. After performing intensity and/or saturation correction, the image frame may be converted back to the original color space.

Thereafter, at a step 220 (determining step), it may be determined whether to perform mid-tone correction for the pixel value of the color space component ($I_{IN}$). For example, a pixel within an image (e.g., from a video) may be identified as a pixel for which mid-tone correction should be performed. For example, the determination of whether to perform mid-tone correction may depend on whether the pixel's intensity, lightness, value, brightness or like component lies within a certain range of intensity/lightness/value/brightness values. This range may be determined automatically based on preselected criteria, or it may be specified by the user in some embodiments. In some embodiments, the range may demarcate the mid-tone range or any other arbitrary range provided by the user.

Figure 3:
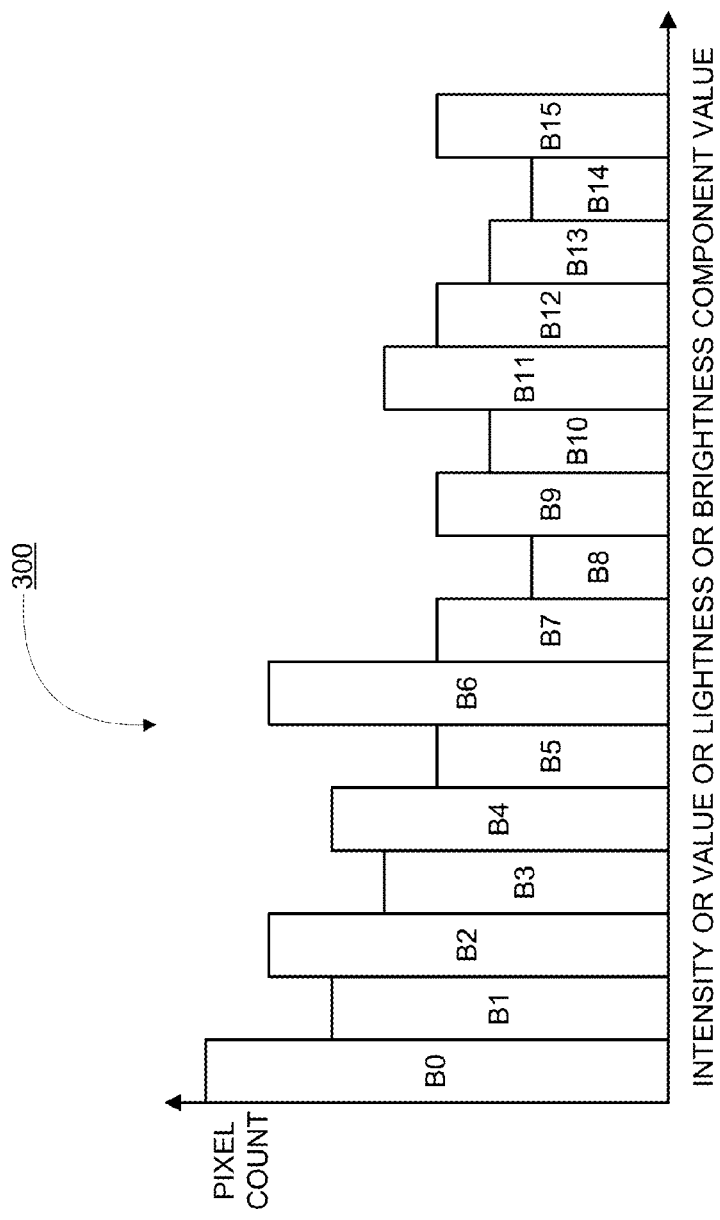
FIG. 3 is an exemplary histogram according to an exemplary embodiment of the disclosure.

For example, display system 100 implementing such dynamic image correction may be a 10-bit system, with a dynamic range of 0 to 1023 ($2^{10}-1$). The middle of this range may be selected as the mid-tone range. For example, the intensity/value/lightness/brightness component dynamic range may be divided into 16 equal size bins (B0 to B15), as shown in Table 1 below. An exemplary histogram corresponding to Table 1 is shown in FIG. 3, and is discussed in further detail below.

TABLE 1

| Bin No. | Range |
|---------|-------|
| B0 | 0 ($I_S$)-63 |
| B1 | 64-127 |
| B2 | 128-191 |
| B3 | 192-255 |
| B4 | 256-319 |
| B5 | 320 ($m_S$)-383 |
| B6 | 384-447 |
| B7 | 448-511 |
| B8 | 512-575 |
| B9 | 576-639 |
| B10 | 640-703 ($m_E$) |
| B11 | 704-767 |
| B12 | 768-831 |
| B13 | 832-895 |
| B14 | 896-959 |
| B15 | 960-1023 ($I_E$) |

Here, as an example, the middle three-eighths of the bins (B5-B10), having a range 320-703, may be selected as mid-tone bins, with the lower bound of bin B5 (320) in Table 1 identified as the mid-tone correction start point ($m_S$) and the upper bound of bin B10 (703) in Table 1 may be the mid-tone correction end point ($m_E$). End-points 0 and 1023 may be the intensity correction start point ($I_S$), and intensity correction end point ($I_E$), respectively. In an alternative embodiment, a "buffer space" at one or either end may be used. There, for example, in a 10-bit display system, allowable intensity values may fall in the range 20-1000, where the remaining ranges 0-19 and 1000-1023 may be used as buffer space). It is to be understood that any values of ($I_S$), ($I_E$), ($m_S$), and ($m_E$) may be used, as long as ($m_S$) and ($m_E$) lie between ($I_S$) and ($I_E$).

Alternative approaches may be employed for determining whether to apply intensity or saturation correction to a pixel within an image. The determination of whether to perform mid-tone correction for pixels in one video frame of a video may depend on pixel values in one or more adjacent or neighboring frames (e.g., those within a pre-specified distance from the frame for which the correction is performed). The amount of intensity or saturation correction applied to the pixels in one video frame may also be calculated using pixel values from adjacent or neighboring frames.

At step 230 (calculating step), a corrected pixel value ($I_{OUT}$) (or ($S_{OUT}$)) may be calculated, for example, in the event that a mid-tone correction is determined to be needed for the pixel value of the color space component. Calculating step 230 may proceed in a number of ways. As an example, the corrected pixel values may be obtained using a look-up table, which may directly map input pixel intensity values with corrected pixel intensity or saturation values. In another example, the corrected pixel values may be calculated in real time using an equation. In another example, the corrected pixel values may be calculated to produce a desired statistical characteristic, such as a uniform distribution values after correction. The desired characteristic may be based on some desired visual characteristic, such as mean brightness value or the like.

For example, the corrected pixel value ($I_{OUT}$) may be calculated using equations 1 and 2 below:

$$(I_{OUT}) = \text{Intensity correction} - \text{mid-tone correction} \quad (1)$$

$$I_{OUT} = \left(I_S + \left[\frac{(I_{IN} - I_S)^{\gamma_I}}{(I_E - I_S)^{(\gamma_I - 1)}}\right]\right) - \left(m_S + \left[\frac{(I_{IN} - m_S)^{\gamma_M}}{(m_E - m_S)^{(\gamma_M - 1)}}\right]\right) \quad (2)$$

Here, ($I_S$) is an intensity correction start point, ($I_E$) is an intensity correction end point, ($m_S$) is a mid-tone correction start point, ($m_E$) is a mid-tone correction end point, ($\gamma_I$) is an intensity gain and ($\gamma_M$) is a mid-tone gain.

The calculating step 230 is explained in further detail below in conjunction with FIGS. 3 and 4. In an exemplary embodiment, step 230 may receive raw pixel values generated at an image sensor (for example, a charge-coupled device (CCD)). In some such embodiments, individual image sensing transistors may be dynamically biased to obtain corrected pixel values. In yet another configuration, step 230 may receive pixel values at an image display device. Again, individual light emitting transistors may be dynamically biased based on the calculated corrected pixel values.

In some embodiments, the determination of whether to perform mid-tone correction or saturation correction for a pixel may be implicit in a formula or equation used to calculate corrected intensity and saturations pixel values, respectively, for the pixel. For example, in an exemplary embodiment, a general intensity (or saturation) correction may apply to all pixels in a video frame, regardless of the intensity value corresponding to that pixel. But mid-tone gain correction (or saturation correction) may be performed only for those pixels that have intensity values lying within a particular range (e.g., from ($m_S$) to ($m_E$), for mid-tone gain correction). Therefore, when intensity correction is performed on a pixel, the determination may need to be made that mid-tone gain correction does apply for that pixel. Even when mid-tone correction is not performed, or only a general correction is performed, the determination has been made that mid-tone gain correction does not apply to this pixel, when at least one other pixel in the image has been subjected to mid-tone correction. Thus, either way, a determination has been made as to whether to apply mid-tone correction, for each pixel individually.

This determination of whether or not to apply mid-tone correction (or saturation correction) can be implicit in the formulae used to compute pixel intensity values. If a formula is configured to discriminate between different pixels based on their intensity values, then the determination of whether to apply a correction or not may be implicit in the formula. As an example, the mid-tone gain correction portion of the formula may be weighted by a factor of '1' or '0' depending on whether the pixel intensity value lies within a range from ($m_S$) to ($m_E$), or outside that range. For example, in equation (2) above, the weight applied to the second term—the mid-tone gain correction term—is a constant '1' (though it is not explicitly shown), and the formula is used only for those pixels having pixel intensity value within a range from ($m_S$) to ($m_E$). The mid-tone gain correction term may be dropped entirely from the equation (i.e., it may be weighted by a factor of '0') for those pixels having pixel intensity value outside the range from ($m_S$) to ($m_E$). In some embodiments, the weighting may be not binary (0/1), but "analog" (e.g., such that the weight can take any value, including fractional numbers). It is to be understood that even when the weighting is not strictly binary, if there is a substantial discrimination between different pixels within the same image based on their intensity values (e.g., asymptotically reducing weights; or constant weights of '0.9' and '0.1' instead of '1' and '0', respectively, depending on whether or not the pixel intensity value lies within a range from ($m_S$) to ($m_E$)), the determination of whether to apply mid-tone correction may still be considered to be occurring.

After step 220, when it is determined whether to perform mid-tone correction on the pixel, at calculating step 230, the corrected pixel values (intensity, saturation) for the pixel may be calculated according to whether the pixel lies within the mid-tone (or saturation correction) range and should undergo correction, or whether there should be no (or visually insignificant) correction. For the 16-bin example above, the corrected pixel values for the mid-tone range (320 to 703) may be calculated to include a mid-tone correction term, while for the remaining ranges, 0-319 and 704-1023, no or insignificant mid-tone correction may be included in the corrected pixel values.

In some embodiments, step 220 may determine that for a certain pixel range, mid-tone correction for a pixel value of the color space component ($I_{IN}$) may not be performed. Considering the 16 bin example, step 220 may determine that mid-tone correction may not be performed for pixels in the ranges 0-319 and 704-1023. Thereafter, using an intensity correction start point ($I_S$) and an intensity correction end point ($I_E$), the corrected pixel value ($I_{OUT}$) may be calculated using equation (3):

$$I_{OUT} = \left(I_S + \left[\frac{(I_{IN} - I_S)^{\gamma_I}}{(I_E - I_S)^{(\gamma_I - 1)}}\right]\right) \quad (3)$$

Equation (3) differs from equation (2) in that the weight applied to the mid-tone gain correction term in equation (3), essentially, is '0'. It is to be understood that any other formula for calculating corrected pixel intensity values may be utilized. The corrected pixel may also depend on user input, as explained later. Finally, at a step 240, the method outputs the corrected pixel value ($I_{OUT}$).

In an exemplary embodiment, the image correction method 200 may be implemented using processor-executable image correction instructions stored in the memory 130 or in a separate hardware chip. In another embodiment, the image correction method 200 may be implemented by a system comprising various software modules for implementing the steps of the method 200. In yet another embodiment, the method image correction 200 may be implemented using a hardware circuit.

FIG. 3 is a histogram 300 corresponding to Table 1 described in connection with FIG. 2 above. The histogram 300 displays the value of a chosen pixel color space component, which could be intensity, value, lightness, or brightness (the "Component"). The x-axis represents Component value and the y-axis represents a pixel count. In this example, the Component dynamic range may be divided into, 16 equal-size bins (B0 to B15), divided into light bins (B11-B15), mid-tone bins (B5 to B10), and dark bins (B0 to B5). However, any number of bins may be used. For a given portion of video content (e.g., a frame), the pixel count for bins B0-B15 is labeled, pb0-pb15. The pixel count in each been bin indicates the position of a given Component in its dynamic range. For example, for a lightness Component, a high pixel count in the dark bins indicates that the current frame is relatively dark.

In an exemplary embodiment, the dark bins may be identified and then used for calculating intensity gain ($\gamma_I$). Here, "dark bin" may be the first N bins of lowest Component values in the generated histogram, in which N is an integer (e.g., B0-B5 in FIG. 3). The intensity gain ($\gamma_I$) may be calculated as follows:

$$\gamma_I = k_1 \left(1 - \frac{pbsum \times pbpeak}{totalpb^2}\right) \quad (4)$$

Here, ($k_1$) is a first user-controllable parameter (generally, $0 < k_1 < 1$), (pbsum) is a sum of histogram values for the identified dark bins, (pbpeak) is a maximum histogram value for the identified dark bins, and (totalpb) is a sum of histogram values for histogram bins included in the generated histogram.

In the example illustrated in FIG. 3, the values of the parameters are calculated using the following equations:

$$pbsum = (pb0 + pb1 + pb2 + pb3 + pb4 + pb5) \quad (5)$$

$$pbpeak = \text{Maximum}(pb0, pb1, pb2, pb3, pb4, pb5) \quad (6)$$

$$totalpb = \sum_{i=0}^{15} pb(i) \quad (7)$$

The intensity gain ($\gamma_I$) for any given Component may thus be dynamically and adaptively computed for each frame. Also, the user may provide input to modify the dynamic brightness correction.

Figure 4:
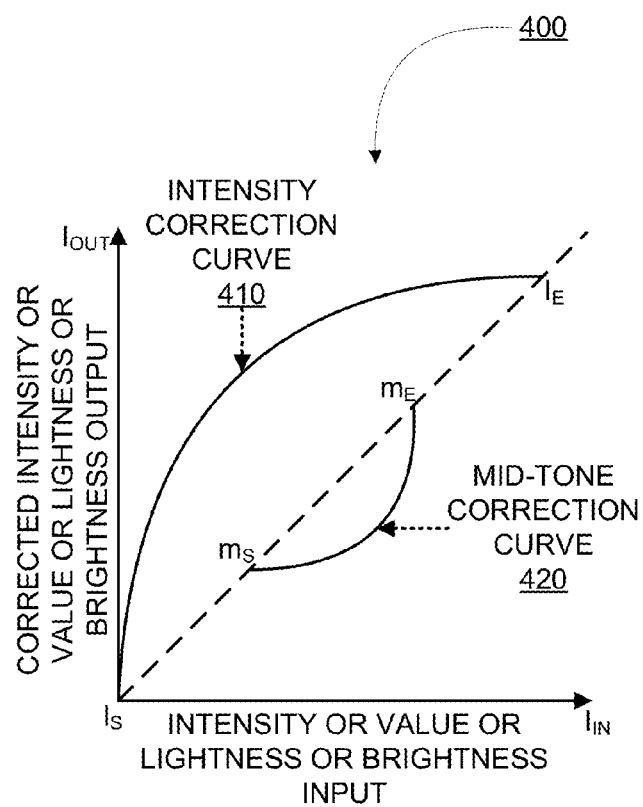
FIG. 4 is a graph of intensity and mid-tone nonlinear dynamic corrections according to an exemplary embodiment of the disclosure.

FIG. 4 illustrates a graph 400 of the intensity and mid-tone nonlinear dynamic corrections applied to Component values in accordance with an exemplary embodiment of the disclosure. The x-axis represents Component input and the y-axis represents the corrected Component output. The intensity correction curve 410 represents intensity corrections calculated in accordance with equations 1, 2 and 3 above. Further, mid-tone correction curve 420 represents mid-tone corrections in accordance with equations 1 and 2 above. Hence, the overall intensity or value or lightness or brightness component correction curve is a function of the intensity correction curve 410 and the mid-tone correction curve 420.

In this example, the intensity correction curve 410 may be applied to all bins, between a predetermined intensity curve correction start point ($I_S$) and intensity curve correction end point ($I_E$). The mid-tone correction curve 420 may be applied to mid-tone bins, between predetermined mid-tone curve correction start point ($m_S$) and mid-tone curve correction end point ($m_E$), where $I_S \leq m_S \leq m_E$ and $m_S \leq m_E \leq I_E$. As an example, for a 10-bit per component display system, ($m_S$) and ($m_E$) may be selected as 320 and 703 respectively.

Mid-tone gain ($\gamma_M$), may be a function of calculated intensity gain ($\gamma_I$). For example, it may be calculated as follows:

$$\gamma_M = k_2 * (2 - \gamma_I) \quad (8)$$

Here, ($k_2$) is an optional user controllable parameter for mid-tone gain control (generally, $0 < k_2 < 1$). Thus, here too, the user may provide input to modify the dynamic brightness correction.

Figure 5:
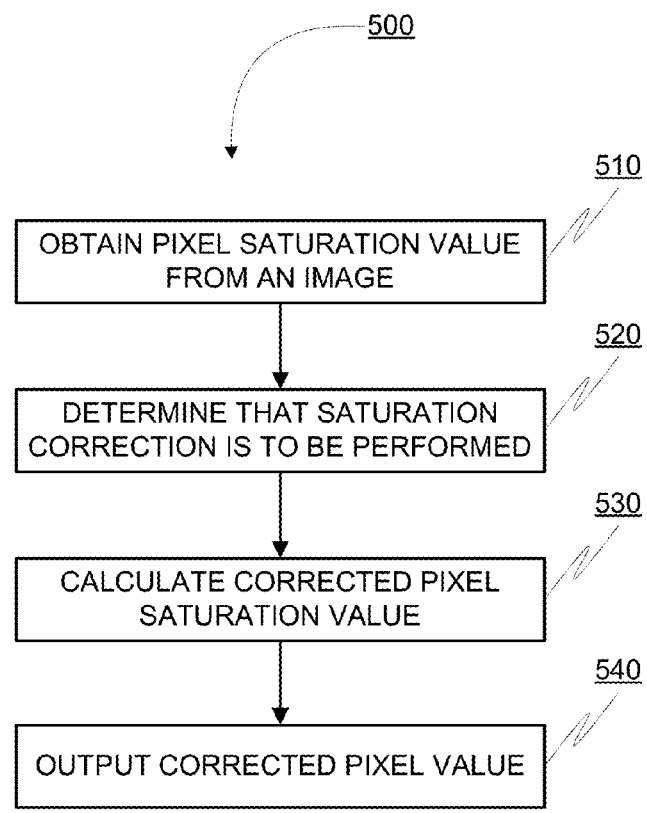
FIG. 5 is a flow diagram illustrating an exemplary saturation correction method according to an exemplary embodiment of the disclosure.

FIG. 5 is a flow diagram illustrating an exemplary saturation correction method 500. The process begins at step 510, by obtaining a pixel saturation value ($S_{IN}$) from an image, which may be a video frame. The pixel saturation values may be obtained at appropriate devices known to those of ordinary skill in the art, such as an image capturing device, an image processing device, a transmission device, an intermediate network server, or at a storage device (such as a Solid-State Drive (SSD). Collection points may be located at, after, or before devices such as the transmission device, an encoder, or a decoder.

The pixel saturation value ($S_{IN}$) may be a saturation component from any color space in which a saturation-like component, such as saturation in the HSL or HSB or HSI or HSV color spaces, can be separated. It is contemplated that saturation correction may be performed in any color space in which a component like Saturation in the HSL/HSB/HSI/HSV color spaces can be separated. It will be recognized by those of ordinary skill in the art that saturation correction may be practiced in conjunction with any color space by converting to-and-from a color space including a component, such as HSL, HSB, HSI, or HSV saturation, that can be separated. For example, the initial color space may be RGB, YUV, YCbCr, or the like, and a conversion may be first performed to-and-from YUV/RGB to a HSI "working" color space, and saturation correction may be performed in the working color space. After performing saturation correction, the image frame may be converted back to the original color space.

At step 520 (the determining step), the determination may be made as to whether saturation correction is to be performed for the pixel. The pixel saturation value may be extracted from a saturation component of a color space, such as a Saturation component from a HSI color space; a HSV color space; a HSL color space; or a HSB color space. Using the pixel saturation value, the determination of whether or not to perform saturation correction may be made. At step 530 (calculating step), a corrected pixel saturation value ($S_{OUT}$) may be calculated based on the determination of whether or not to perform the saturation correction for the image.

At step 530, the corrected pixel saturation values may be calculated in various ways. In an exemplary embodiment, corrected pixel saturation values may be obtained using a look-up table that may directly map input pixel saturation values with corrected pixel saturation values. In an exemplary embodiment, the corrected pixel saturation values may be calculated in real time using a formula. Alternatively, the corrected pixel saturation values may be calculated such that it produces a desired statistical characteristic (e.g. uniform distribution) of brightness/saturation/hue values after correction. The desired statistical characteristic may also be based on some desired visual result such as mean brightness value etc. In a further embodiment, the corrected pixel saturation values ($S_{OUT}$) may be calculated using equation 9 as follows:

$$S_{OUT} = S_S + \left[\frac{(S_{IN} - S_S)^{\gamma_S}}{(S_E - S_S)^{(\gamma_S - 1)}}\right] \quad (9)$$

Here, ($\gamma_S$) is the saturation gain for the image. The dynamically and adaptively computed saturation gain ($\gamma_S$) may be a function of calculated intensity gain ($\gamma_I$). In an exemplary embodiment, ($\gamma_S$) may be calculated as follows:

$$\gamma_S = k_3 * \sqrt{\gamma_I} \quad (10)$$

Here, ($k_3$) is an optional user controllable parameter for saturation gain control (generally, $0 < k_3 < 1$). This benefit is applied in the same manner as the method for calculating intensity gain ($\gamma_I$), explained in detail in conjunction with FIG. 3 above. At step 540, the corrected pixel value is output ($S_{OUT}$).

Raw pixel saturation values generated at an image sensor (for example, charge-coupled device (CCD)) may be used to compute the corrected pixel saturation value. At step 530, image sensing transistors may be dynamically biased to obtain corrected pixel saturation values. As another example, an image display device may receive pixel saturation values. In this exemplary embodiment, the biasing on the individual light emitting transistors may be dynamically varied based on the calculation step 530.

In an exemplary embodiment, the calculating step 530 may calculate corrected pixel saturation values for all pixel saturation values, without any determination at determining step 520 such that all pixels receive a non-zero saturation correction. In another exemplary embodiment, the determining step 520 may determine whether to perform saturation correction on all pixels of an image and the calculating step 520 may calculate the corrected pixel saturation values for all pixels.

In exemplary embodiments, the method 500 may be implemented using processor-executable saturation correction instructions stored in the memory 130 or on a separate hardware chip. In another exemplary embodiment, the saturation correction method 500 may be implemented by a system comprising various software modules for implementing the steps of the method 500. In another embodiment, the method 500 may be implemented using a hardware circuit.

Figure 6:
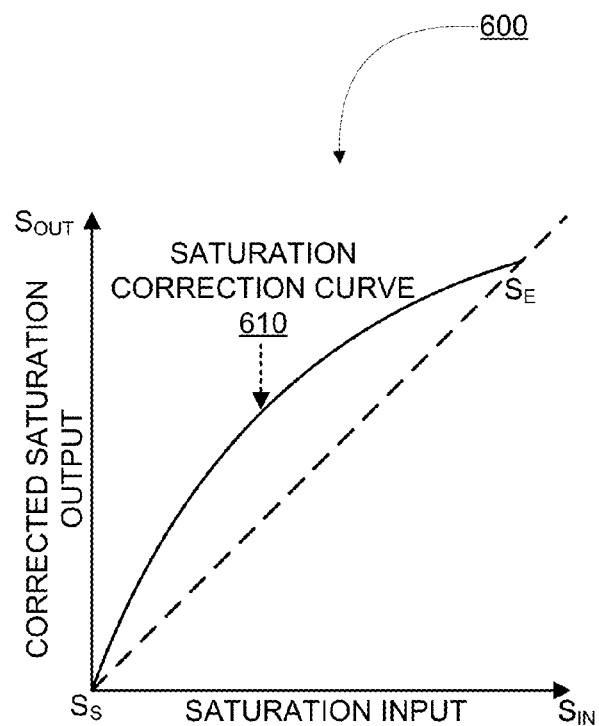
FIG. 6 is a graph of the saturation nonlinear dynamic correction according to an exemplary embodiment of the disclosure.

FIG. 6 is a graph 600 representing saturation nonlinear dynamic correction applied to a saturation component, where the x-axis represents saturation input and the y-axis represents the corrected saturation output. The saturation correction curve 610 may be applied between a predetermined saturation curve correction start point ($S_S$) and saturation curve correction end point ($S_E$). As an example, for a 10-bit per component system, ($S_S$) and ($S_E$) are 0 and 1023 ($2^{10}-1$) respectively. ($S_{IN}$) is the saturation component input and ($S_{OUT}$) is the nonlinear corrected saturation component output. ($S_{OUT}$) may be calculated using equation 9 as described in detail in conjunction with FIG. 5 above.

Figure 7:
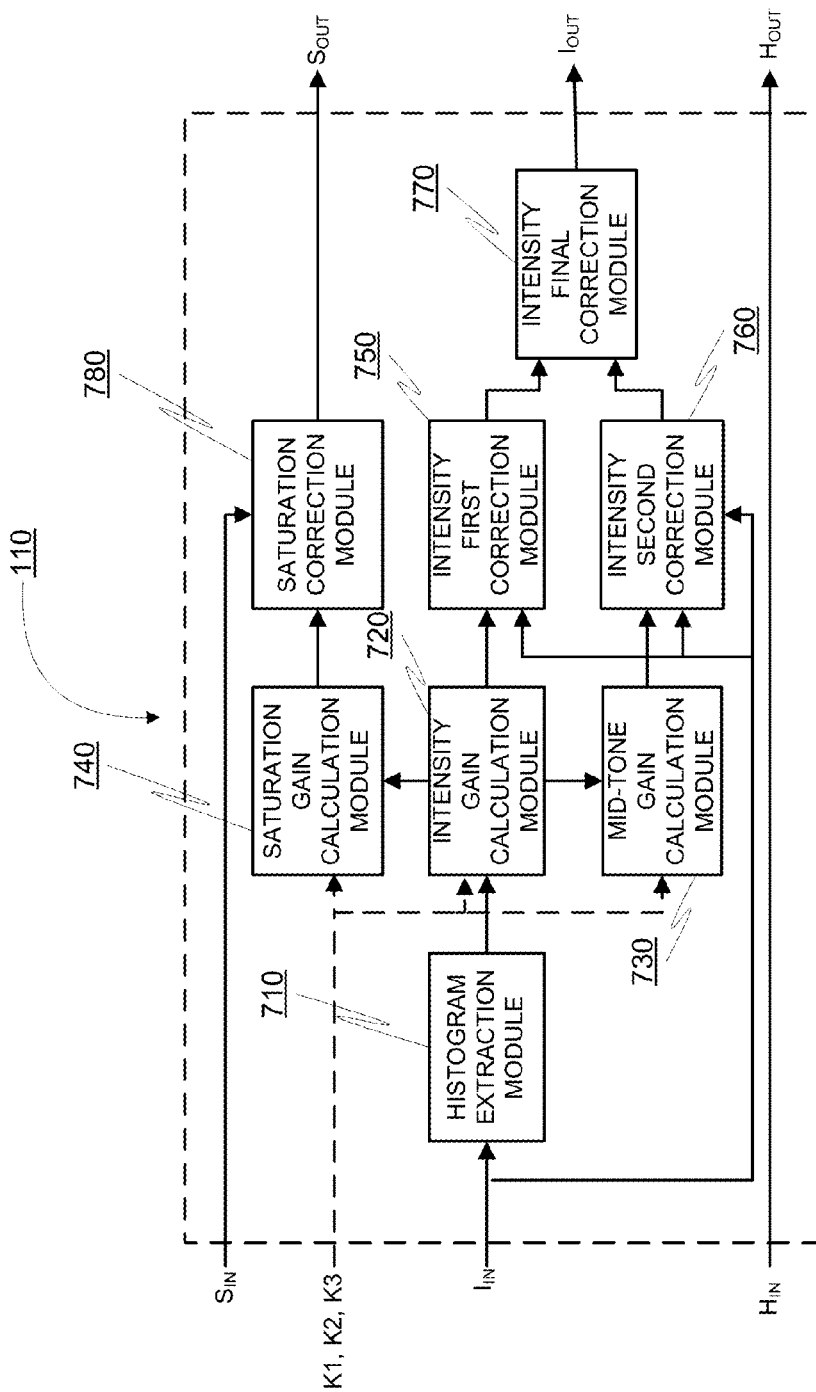
FIG. 7 is a functional block diagram of the image processing system according to an exemplary embodiment of the disclosure.

FIG. 7 illustrates a functional block diagram of the image processing system 110. The image processing system 110 may be software-based; therefore, functionally it may have a structure as shown in FIG. 7. The functionality of each of the modules 710-780 may be defined by the corresponding instructions stored in the memory 130 and executed by the processor 140.

The image processing system 110 may include one or more of a histogram extraction module 710, an intensity gain calculation module 720, a mid-tone gain calculation module 730, a saturation gain calculation module 740, a first intensity correction module 750, a second intensity correction module 760, a final intensity correction module 770, and a saturation correction module 780.

The image processing system 110 may receive pixel values in one of a Hue-Saturation-Intensity (HSI) color space, a Hue-Saturation-Value (HSV) color space, a Hue-Saturation-Lightness (HSL) color space and a Hue-Saturation-Brightness (HSB) color space. Further, the image processing system 110 may receive three user controllable parameters ($k_1$), ($k_2$), and ($k_3$) for calculating an intensity gain, a mid-tone gain and a saturation gain respectively. The histogram extractor module 710 may receive pixel values of the color space component ($I_{IN}$) and form an intensity or value or lightness or brightness component histogram. The pixel counts of various histogram bins may be fed to the intensity gain calculation module 720, and intensity gain calculation module 720 may also receive a first optional user controllable parameter ($k_1$). The intensity gain calculation module 720 may compute the intensity gain ($\gamma_I$) as a function of pixel counts in histogram dark bins and received first optional user controllable parameter ($k_1$). This process is explained in detail in conjunction with FIG. 3 above.

The computed intensity gain ($\gamma_I$) may be fed to the mid-tone gain calculation module 730, the saturation gain calculation module 740, and the intensity first correction module 750. The mid-tone gain calculation module 730 also may receive a second optional user controllable parameter ($k_2$). The mid-tone gain calculation module 730 may compute the mid-tone gain ($\gamma_M$) and provide the same to the intensity second correction module 760. The mid-tone gain calculation module 730 may compute the mid-tone gain using equation (8) described in detail in conjunction with FIG. 4 above.

Thereafter, the intensity first correction module 750 and the intensity second correction module 760 may receive an intensity or value or lightness or brightness input ($I_{IN}$). The intensity first correction module 750 may perform nonlinear correction of the intensity or value or lightness or brightness input received by applying computed intensity gain. The intensity first correction module 750 may compute the intensity correction ($I_{OUT1}$) using equation (11) below (this equation has been described in further detail in conjunction with FIG. 2 above).

$$I_{out1} = I_S + \left[\frac{(I_{IN} - I_S)^{\gamma_I}}{(I_E - I_S)^{(\gamma_I - 1)}}\right] \quad (11)$$

Further, the intensity second correction module 760 may compute the mid-tone correction ($I_{OUT2}$) using equation 12 below (this equation has been described in further detail in conjunction with FIG. 2 above).

$$I_{out2} = m_S + \left[\frac{(I_{IN} - m_S)^{\gamma_S}}{(m_E - m_S)^{(\gamma_M - 1)}}\right] \quad (12)$$

The intensity first correction module 750 and the intensity second correction module 760 may output corrected intensity or value or lightness or brightness outputs to the intensity final correction module 770. The intensity final correction module 770 may also receive an intensity or value or lightness or brightness input ($I_{IN}$). The intensity final correction module 770 may output corrected intensity or value or lightness or brightness output ($I_{OUT}$), which may be a function of inputs from the intensity first correction module 750 and the intensity second correction module 760. In accordance with an exemplary embodiment, the intensity final correction module 770 may output ($I_{OUT}$) defined by equation (2) above, described in detail in conjunction with FIG. 2.

The saturation gain calculation module 740 may compute the saturation gain ($\gamma_S$) and provide that value to the saturation correction module 780. That computation may proceed using the equation (10) described in detail in connection with FIG. 5 above.

In addition, the saturation correction module 780 may receive saturation input ($S_{IN}$). That module also may perform nonlinear correction of saturation input ($S_{IN}$) by applying computed saturation gain, and then output the corrected pixel saturation value ($S_{OUT}$). The saturation correction module 780 may compute ($S_{OUT}$) using equation (9) described in detail in conjunction with FIG. 5 above. In addition, the hue input ($H_{IN}$) component may be unaltered and output as ($H_{OUT}$).

In a further exemplary embodiment, the display system 100 may perform image correction using a method described below. First, a pixel value of a color space component ($I_{IN}$), and a pixel saturation value ($S_{IN}$), from an image may be obtained. Then, a corrected pixel value ($I_{OUT}$) may be calculated as part of dynamic brightness correction, including a mid-tone correction for the pixel value of the color space component ($I_{IN}$). The corrected pixel value ($I_{OUT}$) may be calculated using the equation below:

$$I_{OUT} = \left(I_S + \left[\frac{(I_{IN} - I_S)^{\gamma_I}}{(I_E - I_S)^{(\gamma_I - 1)}}\right]\right) - \left(m_S + \left[\frac{(I_{IN} - m_S)^{\gamma_M}}{(m_E - m_S)^{(\gamma_M - 1)}}\right]\right) \quad (13)$$

Here, ($I_S$) is an intensity correction start point, ($I_E$) is an intensity correction end point, ($m_S$) is a mid-tone correction start point, ($m_E$) is a mid-tone correction end point, ($\gamma_I$) is an intensity gain, and ($\gamma_M$) is a mid-tone gain.

Further, a corrected pixel saturation value ($S_{OUT}$) may be calculated including a saturation correction for the pixel saturation value ($S_{IN}$). The corrected pixel saturation value ($S_{OUT}$) is calculated using the equation below:

$$S_{OUT} = S_S + \left[\frac{(S_{IN} - S_S)^{\gamma_S}}{(S_E - S_S)^{(\gamma_S - 1)}}\right] \quad (14)$$

Here, ($S_S$) is an intensity correction start point, ($S_E$) is an intensity correction end point, and ($\gamma_S$) is a saturation gain. Finally, the corrected pixel value ($I_{OUT}$) and the corrected pixel saturation value ($S_{OUT}$) may be output.

Figure 8:
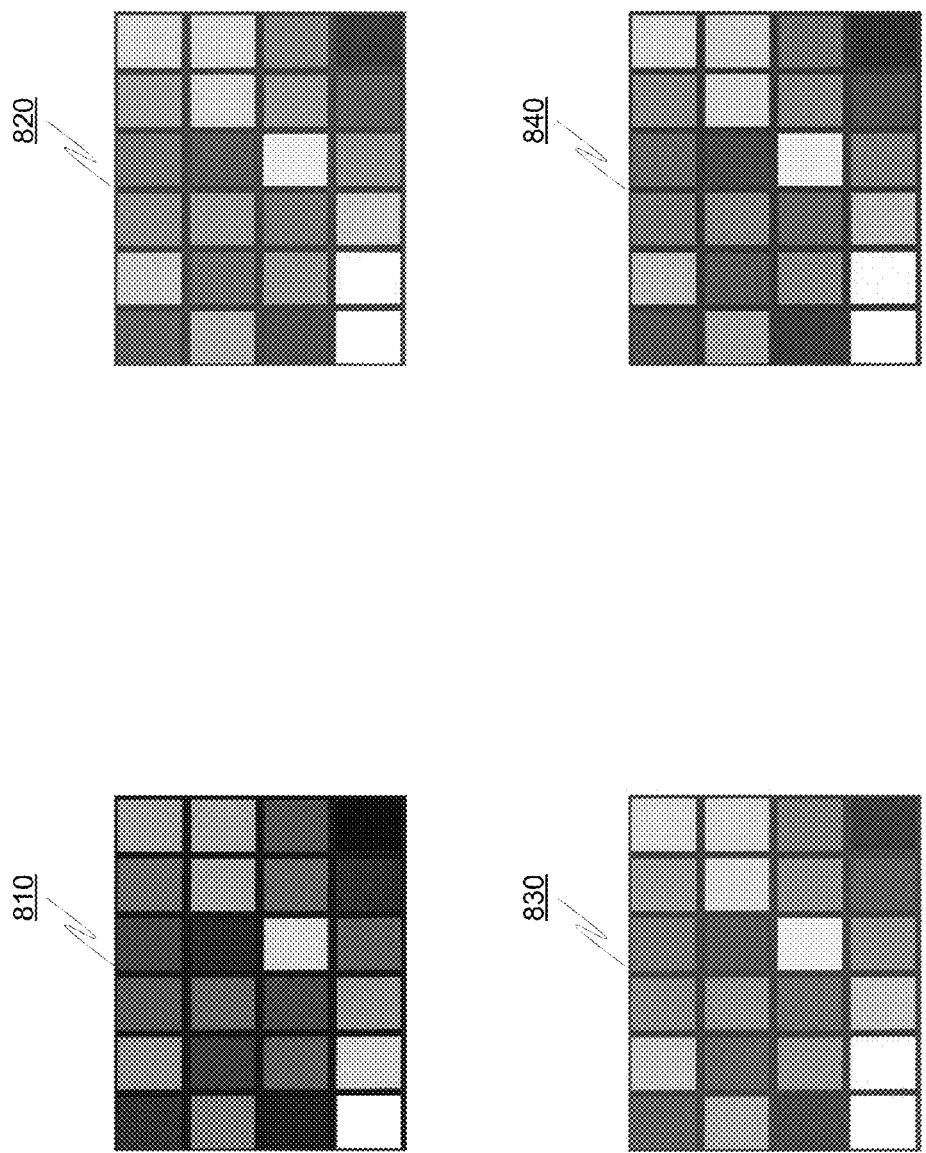
FIG. 8 illustrates input and output images according to an exemplary embodiment of the disclosure.

FIG. 8 illustrates input and output images, according to an exemplary embodiment of the present disclosure. The display system 100 receives an input image 810. The image 830 is the output image obtained after intensity correction is applied to the input image 810. This correction is applied without any mid-tone correction or saturation correction. The image 830 shows faded colors and blurred edges. The image 820 is the output image obtained after the intensity and saturation correction are applied on the input image 810. Saturation correction may be applied in accordance with equation 9 described in detail in conjunction with FIG. 5 above. The image 820 shows improved colors as compared to the image 830, but its edges remain blurred. The image 840 shows the output image obtained after intensity, saturation, and mid-tone correction are applied on the input image 810. The intensity and mid-tone correction may be applied in accordance with the equations 1 and 2 described in detail in conjunction with FIG. 2 above, and the saturation correction may be applied in accordance with equation 9 described in detail in conjunction with FIG. 5 above. The image 840 shows improved colors and reduced blurring of the edges.

Additional illustrative embodiments of the invention are provided below. In an exemplary embodiment, a non-transitory computer-readable medium is disclosed, storing processor-executable image correction instructions for: obtaining a pixel value of a color space component ($I_{IN}$) from an image; determining whether to perform mid-tone correction for the pixel value of the color space component ($I_{IN}$); calculating a corrected pixel value ($I_{OUT}$) based on the determination of whether to perform the mid-tone correction for the pixel value of the color space component; and outputting the corrected pixel value ($I_{OUT}$). The color space component may be one of: an Intensity component from a Hue-Saturation-Intensity color space; a Value component from a Hue-Saturation-Value color space; a Lightness component from a Hue-Saturation-Lightness color space; and a Brightness component from a Hue-Saturation-Brightness color space. The image may include a video frame. The medium may be further storing instructions for: generating a histogram using the pixel value of the color space component ($I_{IN}$); and calculating an intensity gain ($\gamma_I$) using the generated histogram. The medium may be further storing instructions for: determining that mid-tone correction for the pixel value of the color space component ($I_{IN}$) should not be performed; and obtaining an intensity correction start point ($I_S$) and an intensity correction end point ($I_E$); wherein the corrected pixel value ($I_{OUT}$) is calculated using the equation:

$$I_{OUT} = \left(I_S + \left[\frac{(I_{IN} - I_S)^{\gamma_I}}{(I_E - I_S)^{(\gamma_I - 1)}}\right]\right).$$

The medium may be further storing instructions for: identifying a dark bin included in the generated histogram; wherein the intensity gain ($\gamma_I$) is calculated based on a histogram value for the identified dark bin. The dark bin may be one of N bins of lowest color space component values in the generated histogram, and wherein N is an integer. The intensity gain ($\gamma_I$) may be calculated as:

$$\gamma_I = k_1\left(1 - \frac{pbsum \times pbpeak}{totalpb^2}\right),$$

Here, ($k_1$) may a first user-controllable parameter, (pbsum) a sum of histogram values for identified dark bins, (pbpeak) a maximum histogram value for the identified dark bins, and (totalpb) a sum of histogram values for histogram bins included in the generated histogram. The medium may be further storing instructions for: determining a mid-tone gain ($\gamma_M$) based on the calculated intensity gain ($\gamma_I$), after determining that mid-tone correction for the pixel value of the color space component ($I_{IN}$) should be performed; wherein the corrected pixel value ($I_{OUT}$) is calculated based on the mid-tone gain ($\gamma_M$). The medium may be further storing instructions for: obtaining a mid-tone correction start point ($m_S$) and a mid-tone correction end point ($m_E$); wherein determining that the mid-tone correction for the pixel value of the color space component ($I_{IN}$) should be performed includes determining that the pixel value of the color space component ($I_{IN}$) lies between the mid-tone correction start point ($m_S$) and the mid-tone correction end point ($m_E$). The mid-tone gain ($\gamma_M$) may be determined using the equation:

$$\gamma_M = k_2 \times (2 - \gamma_I)$$

Here, ($k_2$) may be a second user-controllable parameter, and ($\gamma_I$) the calculated intensity gain. The corrected pixel value ($I_{OUT}$) may be calculated using the equation:

$$I_{OUT} = \left(I_S + \left[\frac{(I_{IN} - I_S)^{\gamma_I}}{(I_E - I_S)^{(\gamma_I - 1)}}\right]\right) - \left(m_S + \left[\frac{(I_{IN} - m_S)^{\gamma_M}}{(m_E - m_S)^{(\gamma_M - 1)}}\right]\right),$$

Here, ($I_S$) may be an intensity correction start point, ($I_E$) an intensity correction end point, ($m_S$) a mid-tone correction start point, and ($m_E$) a mid-tone correction end point.

In an exemplary embodiment, an image correction system is disclosed, comprising: a processor; and a memory device operatively connected to the processor and storing processor-executable instructions for: obtaining a pixel value of a color space component ($I_{IN}$); determining whether to perform mid-tone correction for the pixel value of the color space component ($I_{IN}$); calculating a corrected pixel value ($I_{OUT}$) based on the determination of whether to perform the mid-tone correction for the pixel value of the color space component; and outputting the corrected pixel value ($I_{OUT}$). The color space component is one of: an Intensity component from a Hue-Saturation-Intensity color space; a Value component from a Hue-Saturation-Value color space; a Lightness component from a Hue-Saturation-Lightness color space; and a Brightness component from a Hue-Saturation-Brightness color space. The pixel value of the color space component ($I_{IN}$) may be obtained from video. The memory device may be further storing instructions for: generating a histogram using the pixel value of the color space component ($I_{IN}$); and calculating an intensity gain ($\gamma_I$) using the generated histogram. The memory device may be further storing instructions for: determining that mid-tone correction for the pixel value of the color space component ($I_{IN}$) should not be performed; and obtaining an intensity correction start point ($I_S$) and an intensity correction end point ($I_E$); wherein the corrected pixel value ($I_{OUT}$) is calculated using the equation:

$$I_{OUT} = \left(I_S + \left[\frac{(I_{IN} - I_S)^{\gamma_I}}{(I_E - I_S)^{(\gamma_I - 1)}}\right]\right).$$

The memory device may be further storing instructions for: identifying a dark bin in the generated histogram; wherein the intensity gain ($\gamma_I$) is calculated using a histogram value for the identified dark bin. The dark bin may be one of N bins of lowest color space component values in the generated histogram, and wherein N is an integer. The intensity gain ($\gamma_I$) is calculated as:

$$\gamma_I = k_1 \left(1 - \frac{pbsum \times pbpeak}{totalpb^2}\right),$$

Here, ($k_1$) may be a first user-controllable parameter, (pbsum) a sum of histogram values for identified dark bins, (pbpeak) a maximum histogram value for the identified dark bins, and (totalpb) a sum of histogram values for all bins in the generated histogram. The memory device may be further storing instructions for: determining a mid-tone gain ($\gamma_M$) based on the calculated intensity gain ($\gamma_I$), after determining that mid-tone correction for the pixel value of the color space component ($I_{IN}$) is to be performed; wherein the corrected pixel value ($I_{OUT}$) is calculated using the mid-tone gain ($\gamma_M$). Determining that the mid-tone correction for the pixel value of the color space component ($I_{IN}$) is to be performed may include determining that the pixel value of the color space component ($I_{IN}$) lies between a mid-tone correction start point ($m_S$) and a mid-tone correction end point ($m_E$). The mid-tone gain ($\gamma_M$) is determined using the equation:

$$\gamma_M = k_2 \times (2 - \gamma_I),$$

Here, ($k_2$) may be a second user-controllable parameter, and ($\gamma_I$) the calculated intensity gain. The corrected pixel value ($I_{OUT}$) may be calculated using the equation:

$$I_{OUT} = \left(I_S + \left[\frac{(I_{IN} - I_S)^{\gamma_I}}{(I_E - I_S)^{(\gamma_I - 1)}}\right]\right) - \left(m_S + \left[\frac{(I_{IN} - m_S)^{\gamma_M}}{(m_E - m_S)^{(\gamma_M - 1)}}\right]\right),$$

Here, ($I_S$) may be an intensity correction start point, ($I_E$) an intensity correction end point, ($m_S$) a mid-tone correction start point, and ($m_E$) a mid-tone correction end point.

In an exemplary embodiment, an image correction method is disclosed, comprising: obtaining a pixel value of a color space component ($I_{IN}$) from an image; determining whether to perform mid-tone correction for the pixel value of the color space component ($I_{IN}$); calculating, via a processor, a corrected pixel value ($I_{OUT}$) after determining whether to perform the mid-tone correction for the pixel value of the color space component; and outputting the corrected pixel value ($I_{OUT}$). The color space component is one of: an Intensity component from a Hue-Saturation-Intensity color space; a Value component from a Hue-Saturation-Value color space; a Lightness component from a Hue-Saturation-Lightness color space; and a Brightness component from a Hue-Saturation-Brightness color space. The image may be a video frame. The method may further comprise: generating a histogram using the pixel value of the color space component ($I_{IN}$); and calculating an intensity gain ($\gamma_I$) using the generated histogram. The method may further comprise: determining that mid-tone correction for the pixel value of the color space component ($I_{IN}$) need not be performed; and obtaining an intensity correction start point ($I_S$) and an intensity correction end point ($I_E$); wherein the corrected pixel value ($I_{OUT}$) is calculated using the equation:

$$I_{OUT} = \left(I_S + \left[\frac{(I_{IN} - I_S)^{\gamma_I}}{(I_E - I_S)^{(\gamma_I - 1)}}\right]\right).$$

The method may further comprise: identifying a dark bin included in the generated histogram; wherein the intensity gain ($\gamma_I$) is calculated using a histogram value for the identified dark bin. The dark bin is one of N bins of lowest color space component values in the generated histogram, and wherein N is an integer. The intensity gain ($\gamma_I$) may be calculated as:

$$\gamma_I = k_1\left(1 - \frac{pbsum \times pbpeak}{totalpb^2}\right).$$

Here, ($k_1$) may be a first user-controllable parameter, (pbsum) a sum of histogram values for identified dark bins, (pbpeak) a maximum histogram value for the identified dark bins, and (totalpb) a sum of histogram values for histogram bins included in the generated histogram. The method may further comprise: determining a mid-tone gain ($\gamma_M$) using the calculated intensity gain ($\gamma_I$), after determining that mid-tone correction for the pixel value of the color space component ($I_{IN}$) is to be performed; wherein the corrected pixel value ($I_{OUT}$) is calculated based on the mid-tone gain ($\gamma_M$). Determining that the mid-tone correction for the pixel value of the color space component ($I_{IN}$) is to be performed may include determining that the pixel value of the color space component ($I_{IN}$) satisfies the relationship: $m_S \leq I_{IN} \leq m_E$, wherein $m_S$ is a mid-tone correction start point, and $m_E$ is a mid-tone correction end point. The mid-tone gain ($\gamma_M$) may be determined using the equation:

$$\gamma_M = k_2 \times (2 - \gamma_I),$$

Here, ($k_2$) may be a second user-controllable parameter, and ($\gamma_I$) the calculated intensity gain. The corrected pixel value ($I_{OUT}$) may be calculated using the equation:

$$I_{OUT} = \left(I_S + \left[\frac{(I_{IN} - I_S)^{\gamma_I}}{(I_E - I_S)^{(\gamma_I - 1)}}\right]\right) - \left(m_S + \left[\frac{(I_{IN} - m_S)^{\gamma_M}}{(m_E - m_S)^{(\gamma_M - 1)}}\right]\right),$$

Here, ($I_S$) may be an intensity correction start point, ($I_E$) an intensity correction end point, ($m_S$) a mid-tone correction start point, and ($m_E$) a mid-tone correction end point.

In an exemplary embodiment, a non-transitory computer-readable medium is disclosed, storing processor-executable saturation correction instructions for: obtaining a pixel saturation value ($S_{IN}$) from an image; determining that intensity correction is to be performed for the image; calculating a corrected pixel saturation value ($S_{OUT}$), after determining that intensity correction is to be performed for the image; and outputting the corrected pixel value ($S_{OUT}$). The pixel saturation value ($S_{IN}$) may be a pixel value of a Saturation component from one of: a Hue-Saturation-Intensity color space; a Hue-Saturation-Value color space; a Hue-Saturation-Lightness color space; and a Hue-Saturation-Brightness color space. The image may include a video frame. The intensity correction may include correction of a pixel value of one of: an Intensity component from a Hue-Saturation-Intensity color space; a Value component from a Hue-Saturation-Value color space; a Lightness component from a Hue-Saturation-Lightness color space; and a Brightness component from a Hue-Saturation-Brightness color space. The medium may be further storing instructions for: calculating a saturation gain ($\gamma_S$) from the image; wherein the corrected pixel saturation value ($S_{OUT}$) is calculated using the calculated saturation gain ($\gamma_S$). The medium may be further storing instructions for: generating a histogram for a color space component from the image; and calculating an intensity gain ($\gamma_I$) using the generated histogram; wherein the saturation gain ($\gamma_S$) is calculated using the calculated intensity gain ($\gamma_I$). The color space component may be one of: an Intensity component from a Hue-Saturation-Intensity color space; a Value component from a Hue-Saturation-Value color space; a Lightness component from a Hue-Saturation-Lightness color space; and a Brightness component from a Hue-Saturation-Brightness color space. The medium may be further storing instructions for: identifying a dark bin in the generated histogram; wherein the intensity gain ($\gamma_I$) is calculated using a histogram value for the identified dark bin. The dark bin is one of N bins of lowest color space component values in the generated histogram, and wherein N is an integer. The intensity gain ($\gamma_I$) may be calculated using the equation:

$$\gamma_I = k_1\left(1 - \frac{pbsum \times pbpeak}{totalpb^2}\right).$$

Here, ($k_1$) may be a first user-controllable parameter, (pbsum) a sum of histogram values for identified dark bins, (pbpeak) a maximum histogram value for the identified dark bins, and (totalpb) a sum of histogram values for histogram bins included in the generated histogram. The saturation gain ($\gamma_S$) is calculated using the equation:

$$\gamma_S = k_3 \sqrt{\gamma_I},$$

Here, ($k_3$) may be a user-controllable parameter, and ($\gamma_I$) the calculated intensity gain. The corrected pixel saturation value ($S_{OUT}$) is calculated using the equation:

$$S_{OUT} = S_S + \left[\frac{(S_{IN} - S_S)^{\gamma_S}}{(S_E - S_S)^{(\gamma_S - 1)}}\right],$$

Here, ($S_S$) may be an intensity correction start point, and ($S_E$) an intensity correction end point.

In an exemplary embodiment, a saturation correction system is disclosed, comprising: a processor; and a memory device operatively connected to the processor and storing processor-executable instructions for: obtaining a pixel saturation value ($S_{IN}$) from an image; determining that intensity correction is to be performed for the image; calculating a corrected pixel saturation value ($S_{OUT}$), after determining that intensity correction is to be performed for the image; and outputting the corrected pixel value ($S_{OUT}$). The pixel saturation value ($S_{IN}$) is a value of a Saturation component from one of: a Hue-Saturation-Intensity color space; a Hue-Saturation-Value color space; a Hue-Saturation-Lightness color space; and a Hue-Saturation-Brightness color space. The image may be a video frame. The intensity correction may include correction of a value of one of: an Intensity component from a Hue-Saturation-Intensity color space; a Value component from a Hue-Saturation-Value color space; a Lightness component from a Hue-Saturation-Lightness color space; and a Brightness component from a Hue-Saturation-Brightness color space. The memory device may be further storing instructions for: calculating a saturation gain ($\gamma_S$) from the image; wherein the corrected pixel saturation value ($S_{OUT}$) is calculated based on the calculated saturation gain ($\gamma_S$). The memory device may be further storing instructions for: generating a histogram for a color space component from the image; and calculating an intensity gain ($\gamma_I$) using the generated histogram; wherein the saturation gain ($\gamma_S$) is calculated based on the calculated intensity gain ($\gamma_I$). The color space component may be one of: an Intensity component from a Hue-Saturation-Intensity color space; a Value component from a Hue-Saturation-Value color space; a Lightness component from a Hue-Saturation-Lightness color space;

and a Brightness component from a Hue-Saturation-Brightness color space. The memory device may be further storing instructions for: identifying a dark bin in the generated histogram; wherein the intensity gain ($\gamma_I$) is calculated based on a histogram value for the identified dark bin. The dark bin may be one of N bins of lowest color space component values in the generated histogram, and wherein N is an integer. The intensity gain ($\gamma_I$) may be calculated using the equation:

$$\gamma_I = k_1\left(1 - \frac{pbsum \times pbpeak}{totalpb^2}\right),$$

Here, ($k_1$) may be a first user-controllable parameter, (pbsum) a sum of histogram values for identified dark bins, (pbpeak) a maximum histogram value for the identified dark bins, and (totalpb) a sum of histogram values for histogram bins included in the generated histogram. The saturation gain ($\gamma_S$) may be calculated using the equation:

$\gamma_S = k_3\sqrt{\gamma_I},$

Here, ($k_3$) may be a user-controllable parameter, and ($\gamma_I$) the calculated intensity gain. The corrected pixel saturation value ($S_{OUT}$) may be calculated using the equation:

$$S_{OUT} = S_S + \left[\frac{(S_{IN} - S_S)^{\gamma_S}}{(S_E - S_S)^{(\gamma_S - 1)}}\right],$$

Here, ($S_S$) may be an intensity correction start point, and ($S_E$) an intensity correction end point.

In an exemplary embodiment, a saturation correction method is disclosed, comprising: obtaining a pixel saturation value ($S_{IN}$) from an image; determining that intensity correction is to be performed for the image; calculating, via a processor, a corrected pixel saturation value ($S_{OUT}$), after determining that intensity correction is to be performed for the image; and outputting the corrected pixel value ($S_{OUT}$). The pixel saturation value ($S_{IN}$) may be a pixel value of a Saturation component from one of: a Hue-Saturation-Intensity color space; a Hue-Saturation-Value color space; a Hue-Saturation-Lightness color space; and a Hue-Saturation-Brightness color space. The image may be a video frame. The intensity correction may include correction of a pixel value of one of: an Intensity component from a Hue-Saturation-Intensity color space; a Value component from a Hue-Saturation-Value color space; a Lightness component from a Hue-Saturation-Lightness color space; and a Brightness component from a Hue-Saturation-Brightness color space. The method may further comprise: calculating a saturation gain ($\gamma_S$) from the image; wherein the corrected pixel saturation value ($S_{OUT}$) is calculated using the calculated saturation gain ($\gamma_S$). The method may further comprise: generating a histogram for a color space component from the image; and calculating an intensity gain ($\gamma_I$) using the generated histogram; wherein the saturation gain ($\gamma_S$) is calculated using the calculated intensity gain ($\gamma_I$). The color space component may be one of: an Intensity component from a Hue-Saturation-Intensity color space; a Value component from a Hue-Saturation-Value color space; a Lightness component from a Hue-Saturation-Lightness color space; and a Brightness component from a Hue-Saturation-Brightness color space. The method may further comprise: identifying a dark bin in the generated histogram; wherein the intensity gain ($\gamma_I$) is calculated using a histogram value for the identified dark bin. The dark bin may be one of N bins of lowest color space component values in the generated histogram, and wherein N is an integer. The intensity gain ($\gamma_I$) may be calculated using the equation:

$$\gamma_I = k_1\left(1 - \frac{pbsum \times pbpeak}{totalpb^2}\right),$$

Here, ($k_1$) may be a first user-controllable parameter, (pbsum) a sum of histogram values for identified dark bins, (pbpeak) a maximum histogram value for the identified dark bins, and (totalpb) a sum of histogram values for histogram bins included in the generated histogram. The saturation gain ($\gamma_S$) may be calculated using the equation:

$\gamma_S = k_3\sqrt{\gamma_I},$

Here, ($k_3$) may be a user-controllable parameter, and ($\gamma_I$) the calculated intensity gain. The corrected pixel saturation value ($S_{OUT}$) may be calculated using the equation:

$$S_{OUT} = S_S + \left[\frac{(S_{IN} - S_S)^{\gamma_S}}{(S_E - S_S)^{(\gamma_S - 1)}}\right],$$

Here, ($S_S$) may be an intensity correction start point, and ($S_E$) an intensity correction end point.

In an exemplary embodiment, a non-transitory computer-readable medium id disclosed, storing processor-executable image correction instructions for: obtaining a pixel value of a color space component ($I_{IN}$), and a pixel saturation value ($S_{IN}$), from an image; calculating a corrected pixel value ($I_{OUT}$) as part of dynamic brightness correction, including a mid-tone correction for the pixel value of the color space component ($I_{IN}$); wherein the corrected pixel value ($I_{OUT}$) is calculated using the equation:

$$I_{OUT} = \left(I_S + \left[\frac{(I_{IN} - I_S)^{\gamma_I}}{(I_E - I_S)^{(\gamma_I - 1)}}\right]\right) - \left(m_S + \left[\frac{(I_{IN} - m_S)^{\gamma_M}}{(m_E - m_S)^{(\gamma_M - 1)}}\right]\right),$$

Here, ($I_S$) may be an intensity correction start point, ($I_E$) an intensity correction end point, ($m_S$) a mid-tone correction start point, ($m_E$) a mid-tone correction end point, ($\gamma_I$) an intensity gain, and ($\gamma_M$) a mid-tone gain. The medium may further store instructions for: calculating a corrected pixel saturation value ($S_{OUT}$) including a saturation correction for the pixel saturation value ($S_{IN}$); wherein the corrected pixel saturation value ($S_{OUT}$) is calculated using the equation:

$$S_{OUT} = S_S + \left[\frac{(S_{IN} - S_S)^{\gamma_S}}{(S_E - S_S)^{(\gamma_S - 1)}}\right],$$

Here, ($S_S$) may be an intensity correction start point, ($S_E$) an intensity correction end point, and ($\gamma_S$) a saturation gain. The medium may further store instructions for outputting the corrected pixel value ($I_{OUT}$) and the corrected pixel saturation value ($S_{OUT}$).

This disclosure describes exemplary systems and methods for providing dynamic brightness correction in digital video. The disclosed methods may be performed in many different ways with either one or both of mid-tone and saturation correction performed, the order of the various steps may be modified, and/or various steps may be omitted or added. Also, the illustrated steps are set out to explain the embodiment shown, and it should be understood that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the invention. It is intended that the disclosure and examples be considered as exemplary only, with a true scope and spirit of the invention being indicated by the following claims.

What is claimed is:

1. A non-transitory computer-readable medium storing processor-executable image correction instructions for:
obtaining a pixel value of a color space component, and a pixel saturation value, from an image;
calculating a corrected pixel value as part of dynamic brightness correction, including a mid-tone correction for the pixel value of the color space component;
wherein the corrected pixel value is calculated as:

$$I_{OUT} = \left(I_S + \left[\frac{(I_{IN} - I_S)^{\gamma_I}}{(I_E - I_S)^{(\gamma_I - 1)}}\right]\right) - \left(m_S + \left[\frac{(I_{IN} - m_S)^{\gamma_M}}{(m_E - m_S)^{(\gamma_M - 1)}}\right]\right),$$

wherein $I_{OUT}$ is the corrected pixel value, $I_{IN}$ is the pixel value of the color space component, $I_S$ is an intensity correction start point, $I_E$ is an intensity correction end point, $m_S$ is a mid-tone correction start point, $m_E$ is a mid-tone correction end point, $\gamma_I$ is an intensity gain, and $\gamma_M$ is a mid-tone gain;
calculating a corrected pixel saturation value for saturation correction of the pixel saturation value;
wherein the corrected pixel saturation value is calculated as:

$$S_{OUT} = S_S + \left[\frac{(S_{IN} - S_S)^{\gamma_S}}{(S_E - S_S)^{(\gamma_S - 1)}}\right],$$

wherein $S_{OUT}$ is the corrected pixel saturation value, $S_{IN}$ is the pixel saturation value, $S_S$ is a saturation correction start point, $S_E$ is a saturation correction end point, and $\gamma_S$ is a saturation gain; and
outputting the corrected pixel value and the corrected pixel saturation value.

2. An electronic circuit configured to perform an image correction method, the method comprising:
obtaining a pixel value of a color space component from an image;
determining whether to perform mid-tone correction for the pixel value of the color space component, wherein the determining comprises determining that mid-tone correction for the pixel value of the color space component should not be performed;
calculating, via the electronic circuit, a corrected pixel value based on the determination of whether to perform the mid-tone correction for the pixel value of the color space component; and
outputting the corrected pixel value, wherein if it is determined that the mid-tone correction for the pixel value of the color space component should not be performed, the corrected pixel value is calculated as:

$$I_{OUT} = I_S + \frac{(I_{IN} \div I_S)^I}{(I_E \div I_S)^{(I1)}},$$

wherein $I_{OUT}$ is the corrected pixel value, $I_{IN}$ is the pixel value of the color space component, $I_S$ is an intensity correction start point, $I_E$ is an intensity correction end point, and $I$ is an intensity gain.

3. The circuit of claim 2, wherein the color space component is one of: an Intensity component from a Hue-Saturation-Intensity color space; a Value component from a Hue-Saturation-Value color space; a Lightness component from a Hue-Saturation-Lightness color space; and a Brightness component from a Hue-Saturation-Brightness color space.

4. The circuit of claim 2, wherein the image includes a video frame.

5. The circuit of claim 2, the method further comprising:
generating a histogram using the pixel value of the color space component; and
calculating the intensity gain using the generated histogram.

6. The circuit of claim 5, the method further comprising:
identifying a dark bin included in the generated histogram; and
wherein the intensity gain is calculated based on a histogram value for the identified dark bin.

7. The circuit of claim 6, wherein the dark bin is one of N bins of lowest color space component values in the generated histogram, wherein N is an integer.

8. The circuit of claim 7, wherein the intensity gain ($\gamma_I$) is calculated as:

$$\gamma_I = k_1\left(1 - \frac{pbsum \times pbpeak}{totalpb^2}\right),$$

wherein $k_1$ is a first user-controllable parameter, pbsum is a sum of histogram values for identified dark bins, pbpeak is a maximum histogram value for the identified dark bins, and totalpb is a sum of histogram values for histogram bins included in the generated histogram.

9. The circuit of claim 2, the method further comprising:
determining that mid-tone correction for the pixel value of the color space component should be performed; and
determining a mid-tone gain based on the calculated intensity gain;
wherein the corrected pixel value is calculated based on the mid-tone gain.

10. The circuit of claim 9, wherein determining that the mid-tone correction for the pixel value of the color space component should be performed includes determining that the pixel value of the color space component lies between a mid-tone correction start point and a mid-tone correction end point.

11. The circuit of claim 9, wherein the mid-tone gain is determined as:

$$\gamma_M = k_2 \times (2 - \gamma_I),$$

wherein $\gamma_M$ is the mid-tone gain, $k_2$ is a second user-controllable parameter, and $\gamma_I$ is the calculated intensity gain.

12. The circuit of claim 11, wherein the corrected pixel value is calculated as:

$$I_{OUT} = \left(I_S + \left[\frac{(I_{IN} - I_S)^{\gamma_I}}{(I_E - I_S)^{(\gamma_I - 1)}}\right]\right) - \left(m_S + \left[\frac{(I_{IN} - m_S)^{\gamma_M}}{(m_E - m_S)^{(\gamma_M - 1)}}\right]\right),$$

wherein $I_{OUT}$ is the corrected pixel value, $I_{IN}$ is the pixel value of the color space component, $I_S$ is an intensity correction start point, $I_E$ is an intensity correction end point, $\gamma_I$ is the calculated intensity gain, $m_S$ is a mid-tone correction start point, $m_E$ is a mid-tone correction end point, and $\gamma_M$ is the mid-tone gain.

13. The circuit of claim 2, wherein the electronic circuit is an integrated circuit.

14. The circuit of claim 2, wherein the electronic circuit is implemented as a system on a chip.

15. The circuit of claim 2, wherein the electronic circuit is implemented using one or more hardware processors configured to execute instructions stored in a memory device that cause the one or more hardware processors to perform the image correction method.

16. A non-transitory computer-readable medium storing processor-executable image correction instructions for:
   obtaining a pixel value of a color space component from an image;
   determining whether to perform mid-tone correction for the pixel value of the color space component, wherein the determining comprises determining that mid-tone correction for the pixel value of the color space component should not be performed;
   calculating a corrected pixel value based on the determination of whether to perform the mid-tone correction for the pixel value of the color space component; and
   outputting the corrected pixel value, wherein if it is determined that the mid-tone correction for the pixel value of the color space component should not be performed, the corrected pixel value is calculated as:

$$I_{OUT} = I_S + \frac{(I_{IN} \div I_S)^I}{(I_E \div I_S)^{(I1)}},$$

wherein $I_{OUT}$ is the corrected pixel value, $I_{IN}$ is the pixel value of the color space component, $I_S$ is an intensity correction start point, $I_E$ is an intensity correction end point, and $_I$ is an intensity gain.

17. The medium of claim 16, further storing instructions for:
   determining that mid-tone correction for the pixel value of the color space component ($I_{IN}$) should be performed;
   wherein the corrected pixel value ($I_{OUT}$) is calculated as:

$$I_{OUT} = \left(I_S + \left[\frac{(I_{IN} - I_S)^{\gamma_I}}{(I_E - I_S)^{(\gamma_I - 1)}}\right]\right) - \left(m_S + \left[\frac{(I_{IN} - m_S)^{\gamma_M}}{(m_E - m_S)^{(\gamma_M - 1)}}\right]\right),$$

wherein $I_{OUT}$ is the corrected pixel value, $I_{IN}$ is the pixel value of the color space component, $I_S$ is an intensity correction start point, $I_E$ is an intensity correction end point, $\gamma_I$ is an intensity gain, $m_S$ is a mid-tone correction start point, $m_E$ is a mid-tone correction end point, and $\gamma_M$ is a mid-tone gain.

18. The medium of claim 17, wherein determining that the mid-tone correction for the pixel value of the color space component should be performed includes determining that the pixel value of the color space component lies between the mid-tone correction start point and the mid-tone correction end point.

* * * * *

UNITED STATES PATENT AND TRADEMARK OFFICE
CERTIFICATE OF CORRECTION

PATENT NO. : 9,007,394 B2  
APPLICATION NO. : 13/768009  
DATED : April 14, 2015  
INVENTOR(S) : Vijay Kumar Kodavalla Page 1 of 1

It is certified that error appears in the above-identified patent and that said Letters Patent is hereby corrected as shown below:

In the Claims

In Claim 16, Col. 22, Line 5,

" $I_{OUT} = I_S + \frac{(I_{IN} + I_S)^I}{(I_E + I_S)^{(I-1)}}$ " should read as -- $I_{OUT} = \left\{ I_S + \left[ \frac{(I_{IN} - I_S)^{\gamma}}{(I_E - I_S)^{(\gamma-1)}} \right] \right\}$ --.

In Claim 16, Col. 22, Line 11, "$I$" should read as -- $\gamma_I$ --.

Signed and Sealed this  
Fifteenth Day of March, 2016

Michelle K. Lee  
*Director of the United States Patent and Trademark Office*